Patented Mar. 14, 1933

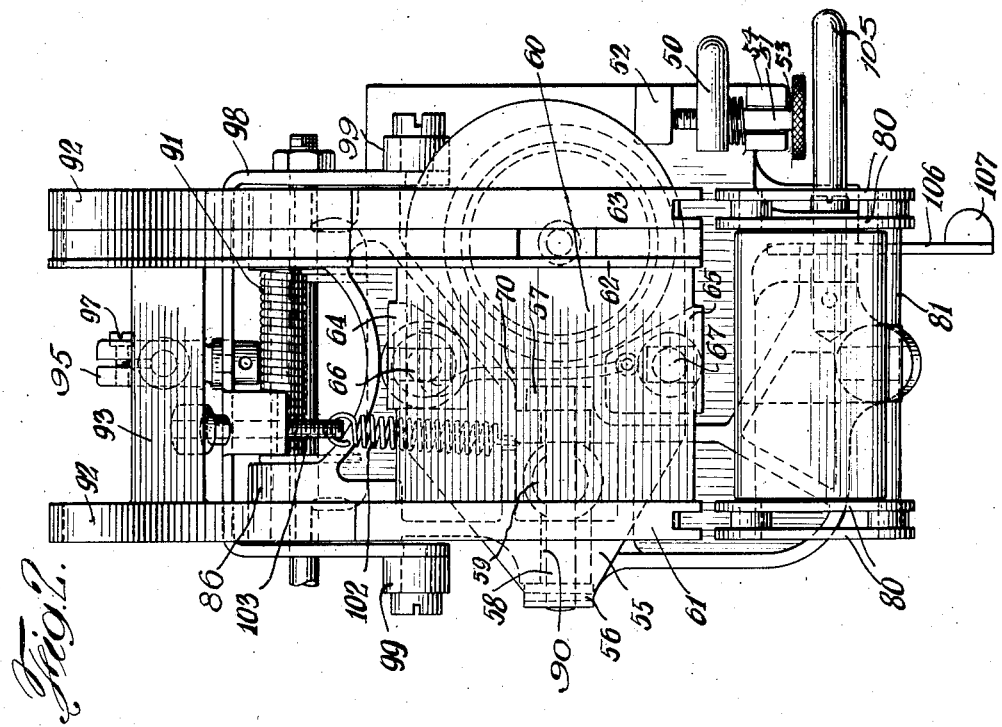

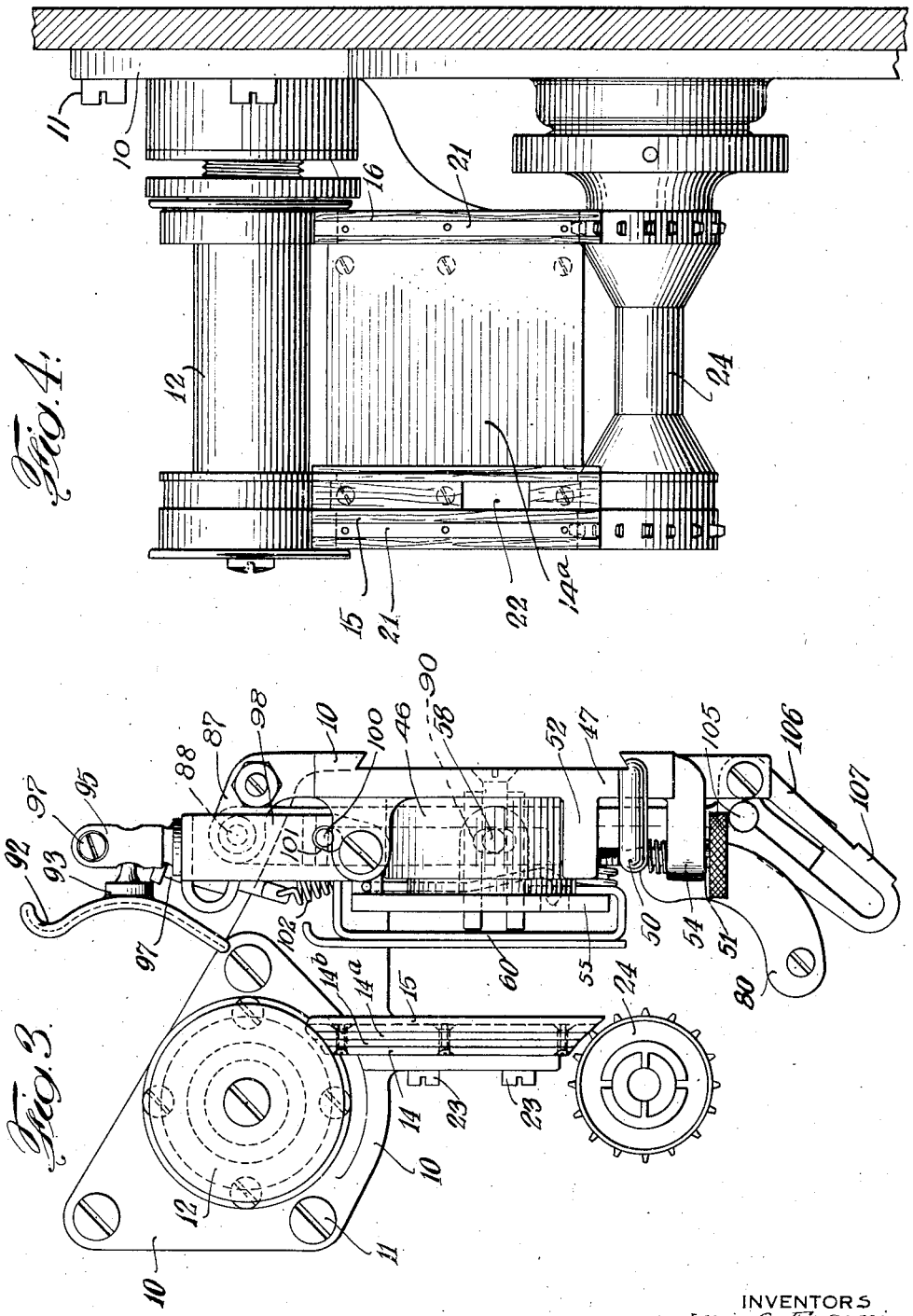

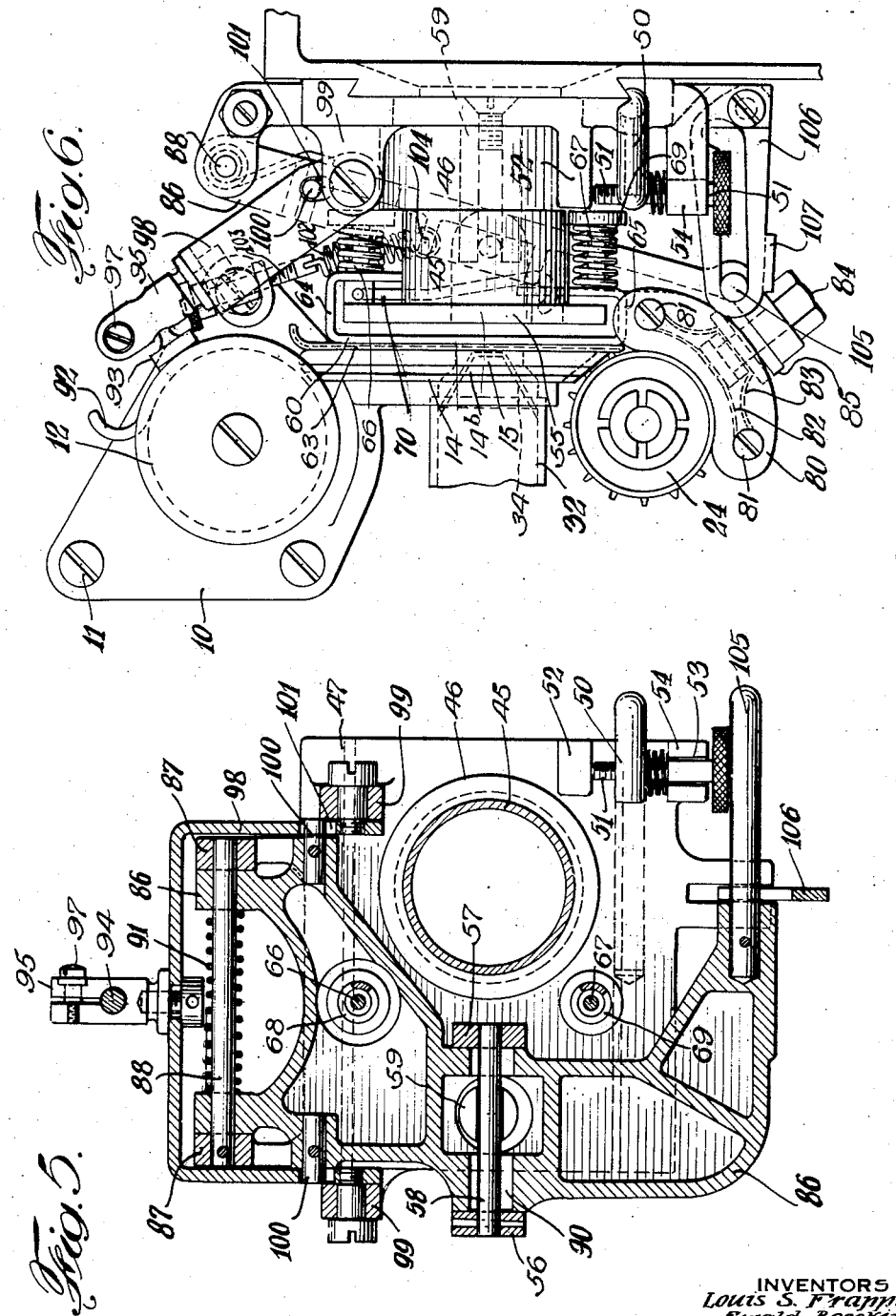

1,900,925

UNITED STATES PATENT OFFICE

LOUIS SIMON FRAPPIER AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

COMPOUND FILM GATE

Application filed October 27, 1928. Serial No. 315,379.

This invention relates to apparatus for reproducing sound from a photographic record, and more particularly to a new and improved aperture plate and film gate for controlling the position of the film with respect to a scanning light.

This application is a continuation in part of our copending application, Serial No. 303,162, filed August 31, 1928, for improvements in projection machine.

The invention relates specifically to an apparatus in which a film, having a photographic sound record incorporated thereon, is uniformly passed through the sound reproducing mechanism including a source of light and means for focusing the light upon the sound record. A continuous sprocket is employed for feeding the film past an aperture plate through which the light rays are projected and suitable pressure shoes are provided for maintaining the film in its desired position.

An object of the present invention is to provide for continuously passing a film through a sound reproducing mechanism.

Another object is to provide means for focusing a light ray upon a photographic sound record.

A further object is to insure a proper relative location of the film and the light rays.

A still further object is to provide for readily releasing the film from the sound reproducing apparatus to facilitate the insertion and removal thereof.

A feature of the invention is an aperture plate having sprockets cooperating therewith for feeding a film thereover at a uniform speed.

Another feature is a plurality of pressure shoes mounted upon separate supports and adapted to maintain the film in firm engagement with the sprockets and aperture plate.

Another feature is a unitary control for simultaneously releasing said pressure shoes.

Various other objects and advantages will be apparent as the nature of the invention is disclosed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a vertical section of the film gate and associated mechanisms;

Fig. 2 is a front elevation of the pressure shoes and supports therefor;

Fig. 3 is a side elevation of the film gate in open position;

Fig. 4 is a front elevation of the aperture plate and associated sprockets;

Fig. 5 is a transverse sectional view showing the control arm by which the position of the pressure shoes is governed; and Fig. 6 is a side elevation of the film gate in closed position.

Like reference characters denote like parts in the several figures of the drawings.

In the following description and in the claims parts will be identified by specific names for convenience, but they are intended to be as generic in their application to similar parts as the art will permit.

The sound reproducing mechanism constructed in accordance with the present invention comprises an aperture plate carried by casting 10 (Figs. 1, 3 and 4) which may be secured to the frame of the machine by suitable means, such as screws 11. Casting 10 also carries idler pulley 12 which is employed for passing and guiding a film 13 over said aperture plate.

The aperture plate comprises a pair of metallic members 14 and 14a separated by a mica sheet 14b. Facing strips 15 and 16 are secured to said metallic members and are provided with a plurality of raised portions (Fig. 4) over which the film is passed. Said strips are formed of a material which will not cause excessive wear of the film, as for example ebony. Steel inserts 21 are located in strips 15 and 16 in the position occupied by the perforations of the film, and prevent the rough edges of the film at that point from damaging the aperture plate.

Light rays are passed through an aperture 22 in said aperture plate. The entire plate may be secured to casting 10 in any desired manner as by screws 23 (Fig. 3). Continuous sprocket 24 may be secured to the frame of the machine in a position to receive the film which is passed over the aperture plate and to feed the same at a uniform rate of speed. The particular construction of said sprocket and the specific driving means therefor form no part of the present invention, and will not be described herein.

A light tube, comprising telescoping members 30 and 31, is located between the end of telescope tube 32 and the aperture plate. Member 30 is provided with a shoulder section 33 which is internally threaded for attachment to the telescope tube 32 and may be knurled if desired to provide a hand grip. Light cone 34 is provided with a narrow horizontal slit 35 which is adapted to be positioned in the aperture 22 of the aperture plate and to direct light upon the sound record. Said light cone is provided with a shoulder section 36 which is adapted to bear against member 14 of the aperture plate when the cone is in operative position. Said cone is also provided with a cylindrical section 37 which may be knurled to provide a hand grip if desired. Dowel pin 38 secured to member 14 slides in a suitable bore 39 in shoulder 36 of the light cone and maintains the slit 35 in horizontal position. Spring 40, seated between shoulders 33 and 36, maintains the telescoping members 30 and 31 in extended position while shoulders 41 and 42 prevent said members from being entirely separated.

The dimensions of light cone 35 should be such that when shoulder 36 is in firm engagement with member 14, the tip of said cone is slightly below the raised portions of strips 15 and 16 over which the film is passed.

In order to remove the light tube from the machine, member 30 may be unscrewed from telescope tube 32 and members 30 and 31 pressed into telescoping relationship against the tension of spring 40 thereby withdrawing light cone 34 from aperture 22 and releasing the tube.

The film gate includes a light tube formed of telescoping member 45 and 46, said member 46 being secured to base plate 47 which is slidably mounted on frame 48, as by cooperating tongue and groove connections, whereby the film gate may be removed from the machine when desired. Base plate 47 may be locked in frame 48 by means of slotted rod 49 which is extended at its end to provide a U-shaped handle 50. Set screw 51 bearing against shoulder 52 on base plate 47 provides for rotating rod 49 to locking position. Slot 53 in extension 54 of base plate 47 cooperates with the shank of set screw 51 to prevent longitudinal movement of rod 49. Said rod may, however, be entirely withdrawn by first removing set screw 51, thereby releasing said rod for longitudinal movement.

Plate 55 is secured to telescoping member 45 and extended sidewardly to support ears 56 and 57 which carry rod 58 by means of which the positon of said plate and of member 45 is determined in a manner to be explained. Slotted pin 59 cooperates with rod 58 for guiding the longitudinal movement thereof.

Pressure shoe 60 is provided with raised sections 61, 62 and 63 which cooperate with the raised sections of strips 15 and 16 of the aperture plate and are adapted to guide the film thereover. The central portion of said pressure shoe at the upper and lower ends thereof is bent rearwardly and inwardly to form ears 64 and 65 which are slotted to pass over pins 66 and 67 respectively. Said pins carry springs 68 and 69 which urge pressure shoe 60 outwardly into film engaging position. Wire 70 is secured to pin 66 and attached to ear 65 for supporting the same free from pin 67 thereby suspending said pressure shoe for substantially free transverse movement in response to springs 68 and 69.

Light cone 71 is slidably secured in member 45 and pressed against shoe 60 by means of spring 72 which is seated between shoulders 73 and 74 on members 71 and 45 respectively. Said light cone is provided with an aperture at its tip which aligns with a corresponding aperture in shoe 60 for receiving light which has been passed through the sound record from telescope 32.

Pressure shoes 80 are adapted to contact with continuous sprocket 24 for guiding the film thereover. They are carried by rods 81 which are supported by spring members 82 and 83. Said spring members are carried by bolt 84 which is provided with adjusting nut 85 by means of which the tension of said members may be regulated. Bolt 84 is secured in arm 86 (Fig. 5) which is pivoted to ears 87 on base plate 47 as by rod 88. Arm 86 is provided with elongated slots 90 which cooperate with rod 58 for controlling the position of telescoping member 45. Spring 91 coiled about rod 88 normally maintains the parts in film engaging position.

Pressure shoes 92 are carried by cross member 93 and secured, by ball 94 and split socket 95, to stud 96. Set screw 97 is associated with split socket 95 for clamping said members in their desired position. The ball and socket connection permits the shoes 92 to be automatically aligned with the film and the idler sprocket. Stud 96 is carried by yoke 98 which is pivoted to suitable ears 99 on base plate 47. Pins 100 are carried by arm 86 and cooperate with elongated slots 101 in yoke 98 for controlling the pivotal position thereof. Spring 102, carried between screw 103 threaded in yoke 98, and projection 104 in arm 86, serves to resiliently hold pressure shoes 92 in firm engagement with the film on idler sprocket 12.

Handle 105 is secured to arm 86 and projects through slotted latch member 106 which is pivoted to base plate 47. When the film gate is in open position, as shown in Fig. 3, handle 105 enters an offset in said latch member whereby the gate is locked in that position. It may again be released by raising latch member 106 by means of tab 107 (Fig. 2) which is provided for that purpose.

In order to open the film gate, arm 86 may be swung toward base plate 47 by means of handle 105. Telescoping tube 45 and yoke 98 are linked to arm 86 and will also be moved into film releasing position. After the film has been threaded over idler pulley 12, the aperture plate and sprocket 24, and film gate may be released by latch 106 and will then occupy the position shown in Figs. 1 and 6. The various pressure shoes 92, 60 and 80 are resiliently mounted and move independently to compensate for any unevenness or irregularities on the film whereby the same may freely pass through the machine.

The resilient mounting for pressure shoe 92 comprises spring 102 which permits a slight movement of said pressure shoe irrespective of the position of arm 86. Shoe 60 is resiliently secured by springs 66, 68 and 69 and shoes 80 are resiliently secured by spring members 82 and 83 for the same purpose. The adjustable light tubes associated with the aperture plate and with the film gate serve to prevent light from external sources from contacting with the photographic sound record on the film.

Although a specific embodiment of the invention has been shown and described for purposes of illustration, it is to be understood that various omissions, substitutions and changes in the forms and details of the device illustrated and in its operation, may be made by those skilled in the art without departing from the scope of the invention, which is not to be limited by the present specific description, but only in accordance with the following claims.

What is claimed is:

1. In combination with an aperture plate, an idler and a continuously rotating sprocket for feeding film thereover, a film gate comprising pivoted members carrying pressure shoes adapted to contact with said idler and and said sprocket, a slidable member mounted independently thereof and carrying pressure shoes adapted to contact with said aperture plate, and a single means for controlling the position of all of said members.

2. In a projection machine, an aperture plate, an idler and a continuously rotating sprocket for feeding a film thereover, pressure shoes associated with said idler and said sprocket, pivotal members for supporting said pressure shoes, a pressure shoe cooperating with said aperture plate and supported by a slidable member, and means interconnecting said pivotal members and said slidable member whereby movement of one of said members causes a corresponding movement of the remainder of said members.

3. In a film gate, a telescoping light tube, a pressure shoe loosely carried thereby, a second pressure shoe, means resiliently supporting said second shoe comprising an arm, pivoted independently of said tube means carried by said pivoted arm for controlling the position of said telescoping light tube, a third pressure shoe, a support therefor pivoted independently of said tube, and means controlling the position of said support in accordance with the position of said pivoted arm.

4. In a film gate comprising a plurality of independently mounted pressure shoes, pivoted members for supporting certain of said shoes, a slidable member for supporting another of said shoes, interconnecting means whereby movement of one of said pivoted members causes a corresponding movement of the other of said pivoted members and of said slidable member, and lockng means whereby said gate may be secured in open position.

5. In a film gate, a light tube comprising a pair of telescoping members, a plate secured to one of said members and extended laterally to provide a pair of supports, a rod carried in said supports, means for preventing rotation of said members, and a pivoted member engaging said rod for controlling the position of said light tube.

6. In an aperture plate, a plurality of metallic members, mica separators therebetween, and facing strips over which a film may be passed, and members of metallic material inserted in said facing strips under the perforated portions of said film.

7. In a projection machine, an aperture plate having film engaging surfaces of comparatively soft material and hard metallic members inserted in said film engaging surfaces and substantially flush therewith in a position to contact with the perforated portions of the film.

8. In a film gate, pressure shoes, a support therefor, and means for mounting said shoes on said support comprising a swivel joint permitting pivotal movement of said shoes in all directions whereby said shoes may be self aligning when pressed into film engaging position.

9. In combination with a pair of pressure shoes, a pair of transverse rods interconnecting the ends of said shoes, a leaf spring extending between said rods and supporting the same and means for supporting said leaf spring and adjusting the tension thereof whereby to adjust the pressure of said shoes.

LOUIS SIMON FRAPPIER.
EWALD BOECKING.